UNITED STATES PATENT OFFICE.

ANDREW H. DANFORTH, OF LEOMINSTER, MASSACHUSETTS, ASSIGNOR, BY DIRECT AND MESNE ASSIGNMENTS, TO THE DANFORTH CHEMICAL COMPANY, OF SACO, MAINE.

INSECTICIDE.

SPECIFICATION forming part of Letters Patent No. 578,862, dated March 16, 1897.

Application filed May 23, 1896. Serial No. 592,852. (No specimens.)

*To all whom it may concern:*

Be it known that I, ANDREW H. DANFORTH, residing in Leominster, county of Worcester, and State of Massachusetts, have invented an Improvement in Bug-Exterminators, of which the following description is a specification.

This invention relates to a novel composition to be used as an exterminator of potato and other bugs now so destructive to vegetable plants and vines.

Prior to this invention I am aware that paris-green has been used to prevent the ravages of potato-bugs and like insects, but this has been found in practice not to be wholly effective for the purpose specified, and is further objectionable on account of the injury to the plants and vines, and also as a source of danger both to human and animal life.

My invention has for its object to provide a composition which is normally passive, but which when applied to the plant or vine and exposed to the atmosphere becomes active and forms a deadly poison for the bug and at the same time a food for the plant or vine, so that the composition serves a twofold purpose—as an exterminator for the bugs and insects and as a food for the plant.

My improved composition is composed, essentially, of a metallic oxid and a salt of ammonia, preferably oxid of zinc and ammonium chlorid, which bodies, in powdered or dried form, are mixed together with the zinc oxid in excess, and this mixture is applied to the vines or plants, and in a substantially short time after exposure to the atmosphere a reaction takes place, which forms zinc chlorid, free ammonia, and water. This reaction may be expressed as follows:

$$ZnO + 2NH_4CL = ZnCl_2 + 2NH_3 + H_2O.$$

The zinc chlorid is the destructive agent for the bugs, &c., and any injurious action it might have upon the plant is more than offset by the beneficial action of the free ammonia, the nitrogen of which is absorbed by the plant or vine and constitutes a food therefor, the hydrogen being set free.

Practical demonstration has proven the fact that the composition referred to when applied to the plants becomes fatal to the bugs and insects and of benefit to the plants. I prefer to manufacture the composition with the zinc oxid in excess of the chlorid of ammonia, and have obtained excellent results with a mixture of ninety-five per cent. of the zinc oxid and five per cent. of the ammonium chlorid, but I do not desire to limit my invention to the precise proportions stated, as a larger percentage of the chlorid may be used.

I claim—

As an improved article of manufacture, a bug-exterminator consisting of a composition of zinc oxid and ammonium chlorid the zinc oxid being in excess of the ammonium chlorid, substantially as and for the purpose specified.

In testimony whereof I have signed my name to this specification in the presence of two subscribing witnesses.

ANDREW H. DANFORTH.

Witnesses:
JAS. H. CHURCHILL,
J. MURPHY.